United States Patent
Han et al.

(10) Patent No.: US 10,572,605 B2
(45) Date of Patent: Feb. 25, 2020

(54) ELECTRONIC DEVICE FOR PROVIDING TRANSLATION SERVICE AND METHOD THEREOF FOR DETERMINING TRANSLATION CANDIDATE TEXT FROM A PLURALITY OF CANDIDATE TEXTS

(71) Applicant: SAMSUNG ELECTRONICS CO., LTD., Suwon-si, Gyeonggi-do (KR)

(72) Inventors: Young-ho Han, Yongin-si (KR); Il-hwan Kim, Yeongcheon-si (KR); Chi-youn Park, Suwon-si (KR); Nam-hoon Kim, Seongnam-si (KR); Kyung-min Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 40 days.

(21) Appl. No.: 15/619,989

(22) Filed: Jun. 12, 2017

(65) Prior Publication Data
US 2017/0364512 A1    Dec. 21, 2017

(30) Foreign Application Priority Data

Jun. 16, 2016    (KR) .................. 10-2016-0075083

(51) Int. Cl.
*G06F 17/28*    (2006.01)
*G10L 13/02*    (2013.01)

(52) U.S. Cl.
CPC ........ *G06F 17/2881* (2013.01); *G06F 17/289* (2013.01); *G10L 13/02* (2013.01)

(58) Field of Classification Search
CPC ..... G06F 17/28; G06F 17/289; G06F 17/2881
USPC ................................. 704/2–8, 277
See application file for complete search history.

(56) References Cited

U.S. PATENT DOCUMENTS

| | | | |
|---|---|---|---|
| 6,356,865 B1 * | 3/2002 | Franz | G10L 15/26 704/2 |
| 6,385,568 B1 * | 5/2002 | Brandon | G06F 17/271 704/2 |
| 8,484,218 B2 | 7/2013 | Raghunath | |
| 2004/0102957 A1 * | 5/2004 | Levin | G06F 17/2735 704/3 |
| 2004/0122666 A1 * | 6/2004 | Ahlenius | G10L 15/22 704/231 |
| 2010/0114556 A1 | 5/2010 | Meng et al. | |

(Continued)

FOREIGN PATENT DOCUMENTS

| | | |
|---|---|---|
| JP | 07-073185 | 3/1995 |
| JP | 2001-100788 | 4/2001 |

(Continued)

*Primary Examiner* — Shaun Roberts
(74) *Attorney, Agent, or Firm* — Nixon & Vanderhye P.C.

(57) ABSTRACT

An electronic device and method for providing a translations service are disclosed. The electronic device for providing a translation service includes an input unit comprising input circuitry configured to receive input text of a first language, a processor configured to divide the input text into a main segment and a sub-segment and to generate output text of a second language by selecting translation candidate text corresponding to the input text from translation candidate text of the second language, based on a meaning of text included in the sub-segment, and an output unit comprising output circuitry configured to output the output text.

16 Claims, 14 Drawing Sheets

INPUT TEXT (101)

MAIN SEGMENT (101a)    SUB-SEGMENT (101b)

(INPUT) "이번 프로젝트가 사장되는 일이 없도록 해주세요. 없어지는 일."

(OUTPUT) "Please make sure there's no work, which has been die out with the project."

OUTPUT TEXT (102)

(56) References Cited

U.S. PATENT DOCUMENTS

| | | | |
|---|---|---|---|
| 2012/0232883 A1* | 9/2012 | Anismovich | G06F 17/28 704/2 |
| 2014/0188456 A1* | 7/2014 | Rylov | G06F 17/2735 704/9 |
| 2014/0316768 A1* | 10/2014 | Khandekar | G06F 16/3329 704/9 |

FOREIGN PATENT DOCUMENTS

| | | |
|---|---|---|
| JP | 2002-032367 | 1/2002 |
| JP | 2008-015844 | 1/2008 |
| KR | 10-0890404 | 3/2009 |
| KR | 10-2013-0055845 | 5/2013 |
| KR | 10-1544690 | 8/2015 |

* cited by examiner

ELECTRONIC DEVICE FOR PROVIDING TRANSLATION SERVICE AND METHOD THEREOF FOR DETERMINING TRANSLATION CANDIDATE TEXT FROM A PLURALITY OF CANDIDATE TEXTS

CROSS-REFERENCE TO RELATED APPLICATION

This application is based on and claims priority under 35 U.S.C. § 119 to Korean Patent Application No. 10-2016-0075083, filed on Jun. 16, 2016, in the Korean Intellectual Property Office, the disclosure of which is incorporated by reference herein in its entirety.

BACKGROUND

1. Field

The present disclosure relates generally to an electronic device and method for providing a translation service, and for example, to an electronic device and method for providing a translation result matching up with a user's intention for a word having multiple meanings.

2. Description of Related Art

As various devices, such as mobile terminals, provide more complex and diverse functions, there is a growing need for automatic translation technology for text or a speech input by using the devices.

Since there are words or sentences having multiple meanings in almost all languages, translation errors may occur due to an insufficient understanding of surrounding context referred to by users during actual conversations.

There is a need to increase translation accuracy and preventing and/or reducing occurrence of translation errors stemming from words or sentences having multiple meanings.

SUMMARY

An electronic device and method for providing a translation result matching up with a user's intention for a word having multiple meanings are provided.

Additional aspects will be set forth in part in the description which follows and, in part, will be apparent from the description.

According to an aspect of an example embodiment of the present disclosure, an electronic device for providing a translation service includes an input unit comprising input circuitry configured to receive input text of a first language, a processor configured to divide the input text into a main segment and a sub-segment and to generate output text of a second language by selecting translation candidate text corresponding to the input text from translation candidate text of the second language, based on a meaning of text included in the sub-segment, and an output unit comprising output circuitry configured to output the output text.

The output text of the second language may be a translation of the main segment of the input text.

The processor may extract translation candidate words of the second language for words included in the input text, and determine first weights for the translation candidate words of the second language, the first weights indicating a degree of similarity between the translation candidate words of the second language and words included in the main segment with respect to the meaning of the text included in the sub-segment.

The processor may set a word included in the main segment and corresponding to a translation candidate word having a highest first weight as a target word which requires further defining based on the sub-segment.

The processor may extract translation candidate words of the second language for words included in the input text, and determine, based on the meaning of the main segment in combination with the sub-segment, second weights for the translation candidate words of the second language, the second weights indicating a degree of irrelevancy between the translation candidate words of the second language and words included in the main segment, when a plurality of translation candidate words of the second language is searched for the words included in the main segment.

The processor may set one of the words included in the main segment and having a highest second weight as a target word sub-segment which requires further defining based on the sub-segment.

The processor may extract translation candidate words of the second language for words included in the input text, and determine third weights for the translation candidate words of the second language, the third weights indicating probabilities of a sequential order between adjacent translation candidate words included among the translation candidate words, when a plurality of translation candidate words of the second language is searched for the words included the main segment.

The processor may select a translation candidate word having a highest third weight from the plurality of translation candidate words of the second language and generate the output text using the selected translation candidate word.

The input unit may include circuitry configured to receive the input text via at least one of speech signals and characters input via a keyboard.

The processor may be configured to convert the input speech signals into the characters when the speech signals are received.

When the input text includes a keyword, the processor may set a first text segment received before the keyword as the main segment and a second text segment received after the keyword as the sub-segment.

The processor may set, as the sub-segment, a portion of the input text which is input simultaneously with a user input or a portion of the input text which is input after the user input.

The processor may convert the output text to an audio signal.

The output unit may include circuitry configured to output at least one of the output text and the audio signal.

According to an aspect of another example embodiment, a method of providing a translation service by an electronic device includes receiving input text of a first language, dividing the input text into a main segment and a sub-segment, generating output text of a second language by selecting translation candidate text corresponding to the input text from translation candidate text of the second language, based on a meaning of text included in the sub-segment, and outputting the output text.

The output text of the second language may be a translation of the main segment of the input text in the generating of the output text.

The generating of the output text may include extracting translation candidate words of the second language for words included in the input text, and determining first weights for the translation candidate words of the second language, the first weights indicating a degree of similarity between the translation candidate words of the second language and words included in the main segment with respect to the meaning of the text included in the sub-segment.

The generating of the output text may include setting a word included in the main segment and corresponding to a translation candidate word having a highest first weight as a target word which requires further defining based on the sub-segment.

The generating of the output text may include extracting translation candidate words of the second language for words included in the input text, and determining, based on the meaning of the main segment in combination with the sub-segment, second weights for the translation candidate words of the second language, the second weights indicating a degree of irrelevancy between the translation candidate words of the second language and words included in the main segment.

The generating of the output text may include setting one of the words included in the main segment and having a highest second weight as a target word which requires further defining based on the sub-segment.

The generating of the output text may include extracting translation candidate words of the second language for words included in the input text and determining third weights for the translation candidate words of the second language, the third weights indicating probabilities of a sequential order between adjacent translation candidate words included among the translation candidate words when a plurality of translation candidate words of the second language is searched for the words included the main segment.

The generating of the output text may include selecting a translation candidate word having a highest third weight from the plurality of translation candidate words of the second language and generating the output text using the selected translation candidate word.

The receiving of the input text may be performed by receiving the input text via at least one of speech signals and characters input via a keyboard.

The generating of the output text may include converting the speech signals into characters when the speech signals are received.

The dividing of the input text into a main segment and a sub-segment may be performed by setting a text segment received before a predetermined keyword as the main segment and a text segment received after the keyword as the sub-segment when the input text includes the keyword.

The dividing of the input text into a main segment and a sub-segment may be performed by setting, as the sub-segment, a portion of the input text which is input simultaneously with a user input or a portion of the input text which is input after the user input.

The generating of the output text may include converting the output text to an audio signal.

The outputting of the output text may be performed by outputting at least one of the output text and the audio signal.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
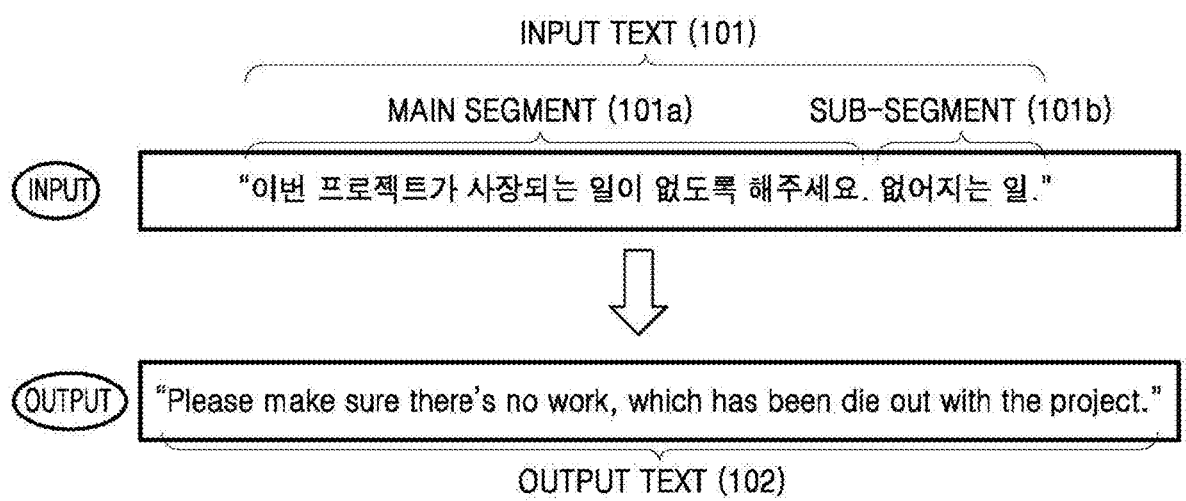
FIG. 1 is a diagram illustrating an example embodiment.

Reference will now be made to various embodiments, examples of which are illustrated in the accompanying drawings, wherein like reference numerals refer to like elements throughout. In this regard, the present embodiments may have different forms and should not be understood as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in this disclosure are general terms currently widely used in the art in consideration of functions in regard to the present disclosure, but the terms may vary according to the intention of those of ordinary skill in the art, precedents, or new technology in the art. Thus, the terms used in the disclosure should be understood not as simple names but based on the meaning of the terms and the overall description of the disclosure.

It will be understood that although the terms "first", "second", etc. may be used herein to describe various components, these components should not be limited by these terms. These terms are only used to distinguish one component from another.

The terms used in the present disclosure are merely used to describe particular example embodiments, and are not intended to limit the present disclosure. An expression used in the singular encompasses the expression of the plural, unless it has a clearly different meaning in the context. When an element is referred to as being "connected to" another element, it may be directly connected to the other element or electrically connected to the other element with an intervening element disposed therebetween. Also, it is to be understood that the terms "include" and "have" are intended to indicate the existence of elements disclosed, and are not intended to preclude the possibility that one or more other elements may exist or may be added.

Throughout the disclosure, particularly, the claims, the term "the" and similar terms may refer to both singular and plural forms. Also, the reference numerals used in operations are not intended to describe the order of operations and the operations may be performed in a different order unless otherwise stated. The present disclosure is not limited by the order of operations.

The terms "according to some embodiments" or "according to an embodiment" used throughout the disclosure do not necessarily indicate the same embodiment.

Some embodiments of the present disclosure may be represented by functional block configurations and various processing operations. Some or all of these functional blocks may be implemented using various numbers of hardware and/or software components that perform particular functions. For example, the functional blocks of the present disclosure may be implemented using one or more microprocessors or circuits for a given function. Also, for example, the functional blocks of the present disclosure may be implemented in various programming or scripting languages. The functional blocks may be implemented with algorithms running on one or more processors. The present disclosure may also employ conventional techniques for electronic configuration, signal processing, and/or data processing. The terms "mechanism", "element", "unit" and "configuration" may be used in a broad sense and are not limited to mechanical and physical configurations.

Also, connection lines or connection members between the components illustrated in the drawings are merely illustrative of functional connections and/or physical or circuit connections. In actual devices, connections between the components may be represented by various functional connections, physical connections, or circuit connections that may be replaced or added.

Hereinafter, the present disclosure will be described in greater detail with reference to the accompanying drawings.

FIG. 1 is a diagram illustrating an example embodiment of the present disclosure.

Figure 13:
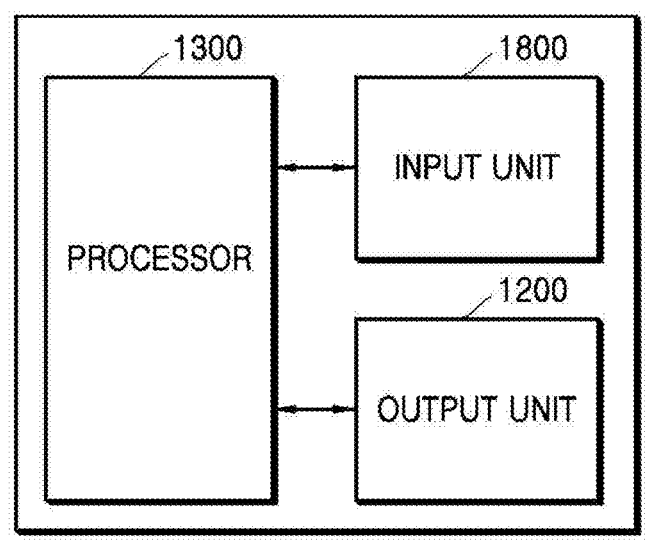
FIGS. 13 and 14 are block diagrams illustrating an example electronic device according to an example embodiment.

According to an embodiment, and referring to FIG. 13, an electronic device 1000 may provide an automatic translation function.

The electronic device 1000 according to an embodiment may receive a speech signal or text from a user via an input unit 1800. The input unit 1800 may include various input circuitry for receiving the input text. Upon receiving the speech signal, the electronic device 1000 may perform automatic speech recognition (ASR) to convert the received speech signal into text.

Automatic speech recognition refers to a process of automatically recognizing a speech signal from a speaker and translating the recognized speed into text. Automatic speech recognition may also be referred to as speech to text (STT), without being limited thereto.

The electronic device 1000 may translate text of a first language into text of a second language by performing machine translation (MT).

Upon completion of machine translation, the electronic device 1000 may convert text of the second language into a speech signal of the second language by performing text to speech (TTS).

Figure 14:
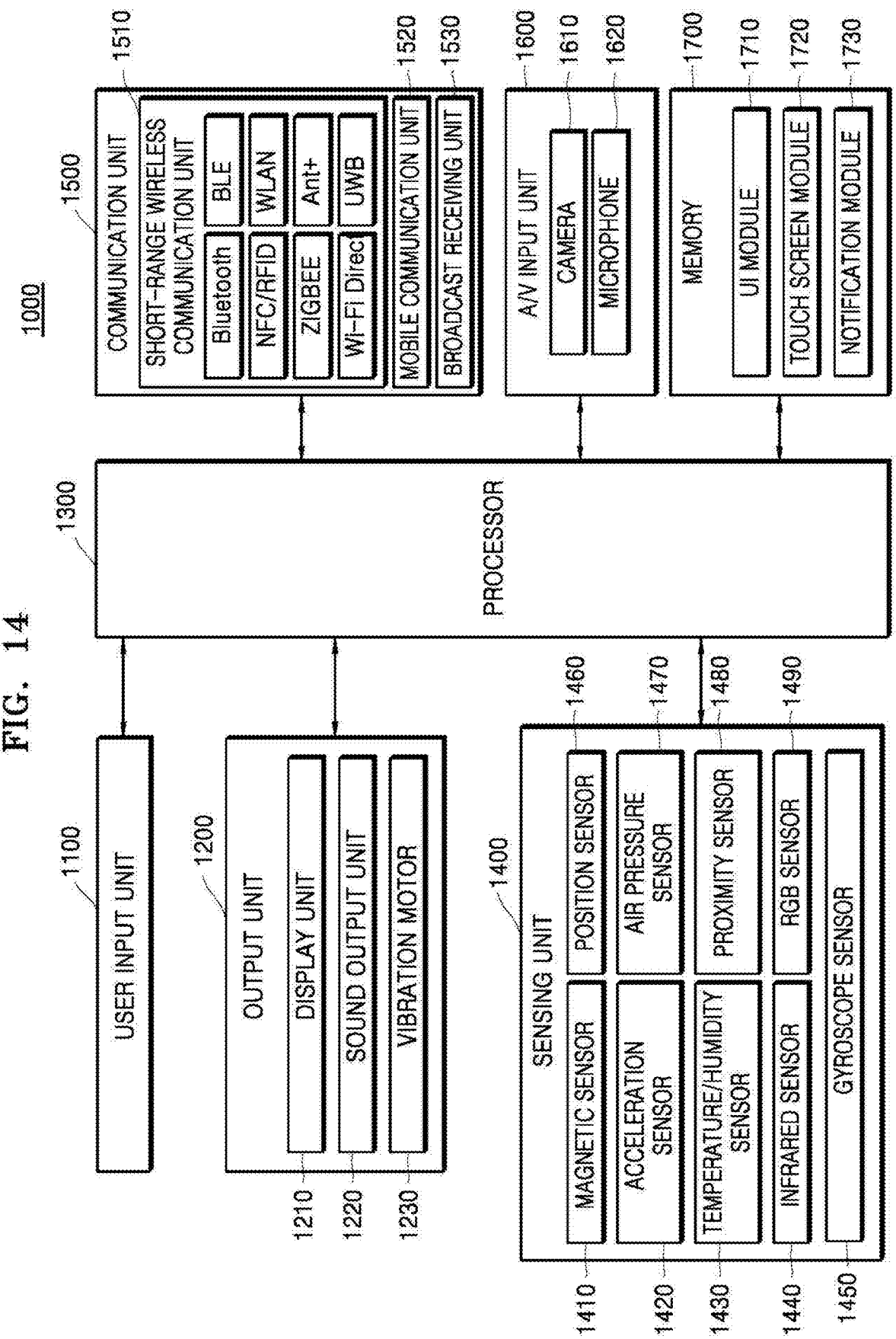

The electronic device 1000 may output the speech signal of the second language via a sound output unit 1220 (see, e.g., FIG. 14). Alternatively, the electronic device 1000 may output the translated text of the second language via a display unit 1210 (see, e.g., FIG. 14).

As described above, the electronic device 1000 may provide an automatic translation service.

In this regard, the electronic device 1000 realizes a method of reducing translation errors that may occur during machine translation depending on characteristics of a language including words or sentences having multiple meanings and deriving a translation result matching up with a user's translation intention.

Particularly, referring to FIG. 1, the electronic device 1000 according to an embodiment may drive output text 102, which is a translation result of the second language matching up with a user's intention corresponding to a main segment 101a, based on a meaning of a sub-segment 101b of the input text 101.

Throughout the disclosure, sentences of the first language input by the user to be translated may be referred to as input text 101, and a translation result of the second language translated by the electronic device 1000 may be referred to as output text 102.

A sentence may refer to a complete textural unit delimited by periods, question marks, exclamation marks, and the like. Also, a sentence may not be complete but include one or more words or a combination of words.

As illustrated in FIG. 1, the electronic device 1000 may receive input text 101 of the first language. The input text 101 according to an embodiment may include a main segment 101a and a sub-segment 101b.

The main segment 101a according to an embodiment may be a sentence to be translated. The sub-segment 101b may be a phrase added to the main segment to further explain the meaning of the main segment 101a to be translated.

For example, referring to FIG. 1, if the input text 101 is "이번 프로젝트가 사장되는 일이없도록 해주세요. 없어지는 일",", the output text 102 may be "Please make sure there's no work, which has been die out with the project."

The input text 101 may be divided into a main segment 101a of "이번 프로젝트가 사 장되는 일이 없도록 해주세요." and a sub-segment 101b of "없어지는 일".

Referring to FIG. 1, the "사장" pronounced as "sajang" in Korean and included in the input text 101 of the first language (Korean) may be a polysemic word. For example, the '사장' in Korean has multiple meanings such as 'president of a company', 'sandy beach', 'no longer be used or practiced', and 'master and senior'.

In the context of the above conversation, the "사장" of the input text 101 means "no longer be used or practiced'. If a translation system selects a word simply based on a statistical method without having clear understanding of surrounding context, a translation result may not match up with the user's intention, and thus there is a potential risk of translation error.

The electronic device 1000 according to an embodiment may accurately generate "die out" as an accurate translation result for the word "사장" included in the main segment 101a and having multiple meanings based on the meaning of the sub-segment 101b ("없어지는 일") additionally explaining the main segment 101a to prevent translation errors.

This will also be described with reference to another example, "도징" pronounced as "dojang" in Korean is used in the meaning of "rubber or wood seal affixed to documents" with a highest probability of 63% among various meanings thereof. The "도징" is used in the meaning of "martial arts studio" with a second highest probability and may also be used in the meanings of "painting" and "master craftsman in sword". Thus, in the case where the speaker does not intend to use "도징" in the meaning of "rubber or wood seal affixed to documents", a probability of translation error may be estimated at 37% via translation by using a statistical method.

According to an embodiment, translation error may be reduced by providing simple additional explanation to a word having multiple meanings to translate the work without using only the statistical method.

In addition, for example, when a user says "공황이 뭔지 선명 좀 해주세요. 정신장애 말이에요.", the word "공황" pronounced as "kongwhang" in Korean refers to "panic" in English. However, the word "공황" may also be used in economics and psychology. In this regard, the speaker may provide an intended meaning of the "공황" by adding "정신장애 (mental disorder)" to the text as additional explanation.

In everyday conversations, the speaker may provide additional explanation about a sentence or word having multiple meanings that may be misunderstood by a counterpart. Thus, the user may obtain an accurate translation result matching up with the user's intention via a convenient and natural method of inputting additional explanation that is similar to a supplementary remark used in everyday conversations.

Also, the electronic device 1000 may not translate all of the sentences input by the user. As illustrated in FIG. 1, the electronic device 1000 may output the translation result of "Please make sure there's no work, which has been die out with the project." of the second language (English) corresponding only to the main segment 101a of "이번 프로젝트가 사 장되는 일이 없도록 해주세요." (Korean) included in the input text 101 except for the sub-segment 101b.

The user may add a word or sentence additionally explaining a word or sentence having multiple meanings during everyday conversations to prevent misunderstanding of the counterpart. However, in the case where a word or sentence, as a translation result of the second language (English), has a single meaning without causing ambiguous interpretation although the word or sentence of the first language (Korean) to be translated has multiple meanings, there is no need to translate the additional explanation input by the user for clear understanding of the word or sentence to be translated.

For example, when the speaker says "공황이 된지 설명 좀 해주세요. 정신장애 말이에요.", and the word "공황" having multiple meanings is accurately translated into "mental panic" instead of "economic crisis", there is no need to repeatedly translate the additional explanation "정신장애" into "mental disorder" and deliver the translated result to the counterpart.

Also, for example, when a speaker says "도장을 찾고 있고 있는데 알려주실 수 있나요? 무술 수 있나요? 무술 수", the "도징" in Korean has multiple meanings and may be misunderstood. Thus, the additional phrase "수련하는 곳" may be required. If the user intends to use "도징" in the meaning of "martial arts studio", which is being used with a relatively lower probability than "object affixed to documents", instead of "object affixed to documents", misunderstanding of a hearer may be prevented by providing an supplementary remark therefor. However, "martial arts studio" is used as a place where people learn martial arts and there is a low risk of misunderstanding in English, a translated language. In this case, if "수련하는 곳 말이에요" included in the input text is translated, the translated result may be regarded as redundancy and restatement of the user's intention in English.

The electronic device 1000 according to an embodiment does not output translated results of all input texts, but outputs a translated result of only a sentence intended by the user by excluding a supplementary remark for additional explanation input by the user. Thus, natural translation results may be obtained in the real translation environment.

Figure 2:
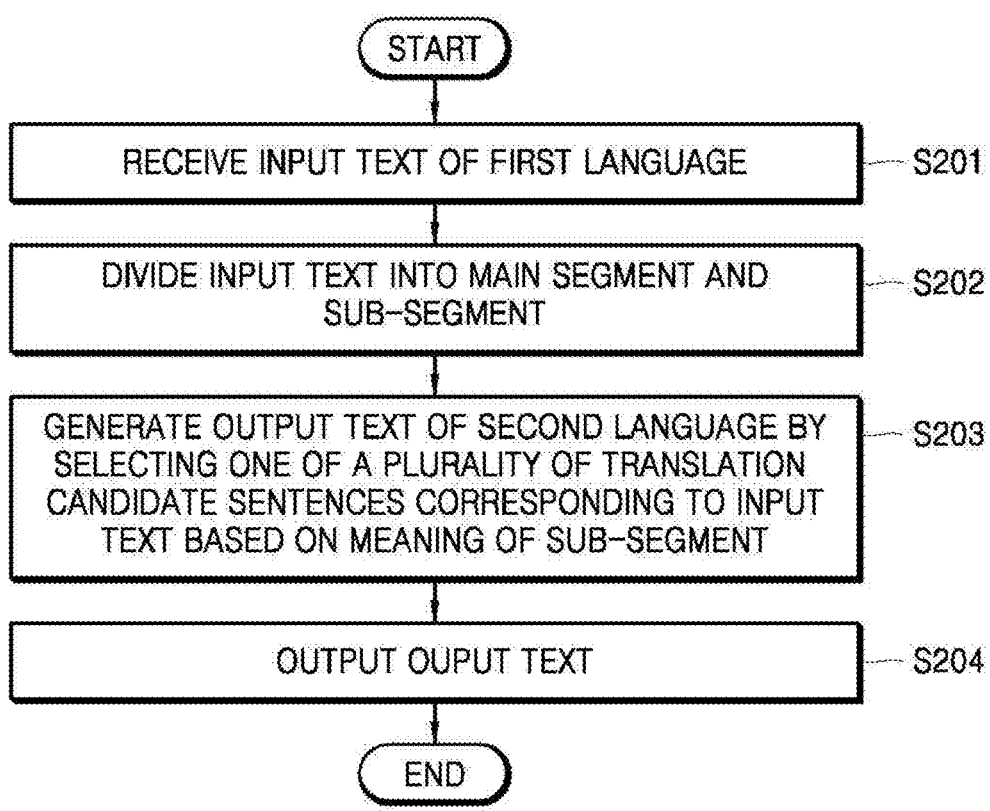
FIGS. 2 and 3 are flowcharts illustrating an example method of providing a translation service implemented by an electronic device according to an example embodiment.
Figure 3:
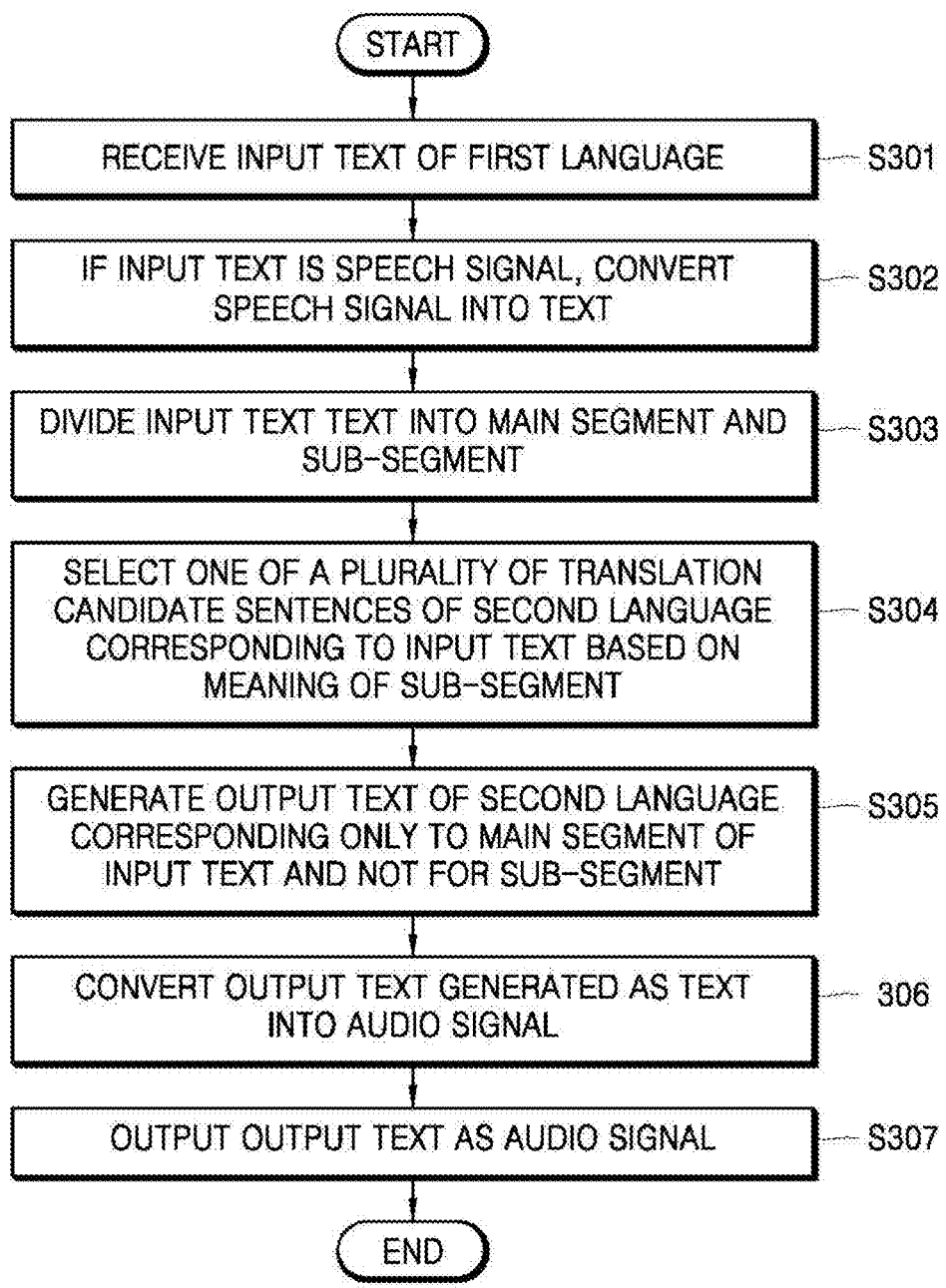

FIGS. 2 and 3 are flowcharts illustrating an example method of providing a translation service implemented by an electronic device according to an example embodiment.

Referring to FIG. 2, in operation S201, the electronic device 1000 according to an embodiment may receive input text of the first language.

The electronic device 1000 may receive the input text.

The electronic device 1000 may also receive the input text as a speech signal. If the input text is a speech signal, the electronic device 1000 may convert the received speech signal into text.

As another example, the electronic device 1000 may acquire input text by extracting text from an image file by performing optical character recognition (OCR). However, the present disclosure is not limited thereto.

In operation S202 of FIG. 2, the electronic device 1000 may divide the input text into a main segment and a sub-segment.

As described above with reference to FIG. 1, the input text 101 may include the main segment 101a and the sub-segment 101b.

The electronic device 1000 may determine a portion of the input text input simultaneously with a user input (for example, input via a predetermined physical button and touch input to the display unit 1210) or a portion input after the user input as the sub-segment. This will be described later in greater detail with reference to FIG. 4.

Also, if the input text includes a predetermined keyword, the electronic device 1000 may determine one portion of the input text before the keyword as a main segment and another portion after the keyword as a sub-segment. For example, if the user says "도장을 찾고 있습니다. 덧붙임. 수 련하는 곳", the electronic device 1000 may divide the text into the main segment and the sub-segment based on the predetermined keyword (e.g., "덧붙임").

In addition, the electronic device 1000 according to an embodiment may divide the text into the main segment and the sub-segment by calculating at least one value of a first weight (degree of similarity), a second weight (degree of dramatic change), and a third weight (likelihood) as a value used to analyze text and translate the text into another language. The first, second, and third weights will be described later in more detail with reference to FIGS. 5 to 12.

In addition, upon determination that a word is repeated in the input text, for example, "도장을 찾고 있습 니다. 도장은 운동하는 곳 을 말합니다" said by the user, the electronic device 1000 may determine a portion of the input text after the second "도징" as the sub-segment. Also, the electronic device 1000 may set the word "도징" of the main segment as a word which requires further defining based on the sub-segment.

As another example, upon receiving the input text as a speech signal, the electronic device 1000 may divide the input text into the main segment and the second based on differences of energy, pitch, waveform, spectrum, and the like of the speech signal. This is because the user generally speaks the main segment to be translated louder and the sub-segment, as additional explanation, quieter.

As another example, if the input text includes a string of words that is not a complete sentence with a high probability, the electronic device 1000 may determine that the string of words is the sub-segment. Also, when the input text includes a predetermined suffix, the electronic device 1000 may determine that a portion including the suffix is the sub-segment with a high probability. For example, if the input text is "도장을 찾고 있습 니다. 운동하는 곳", the supplementary remark ("운동하는 곳") may be the sub-segment since the supplementary remark is not a complete sentence and includes a word indicating location, object, or person such as "~곳/데, ~것, and 사람" (bound noun in case of Korean).

As another example, the electronic device 1000 may set a word located closer to the supplementary remark as a target word which requires further explanation using the supplementary remark with a high probability among the words included in the input text.

If the speaker says the supplementary remark, it is highly probable that the supplementary remark is spoken immediately after saying the target word having multiple meanings. As a word is farther from the target word, the probability of providing additional explanation decreases.

As a distance between a word included in the main segment and the sub-segment increases, the probability that the word is a target word may decrease. This indicates that the probability that a word included in the main segment is a target word is inversely proportional to the distance between the word of the main segment and that of the sub-segment.

This may be expressed by the following equation.

Probability of being target word=alpha/dist(sub-segment, Word[i])

In this case, alpha is a constant experimentally estimated. The dist(word1, word2) refers to a distance between a first word word1 and a second word word2.

As another example, the electronic device 1000 may output a message asking the user to input additional explanation. If the input text includes a word having multiple meanings and translation accuracy is lower than a predetermined threshold value, the electronic device 1000 may determine that additional explanation therefor is required and ask the user to provide additional explanation for the word.

Also, the speaker may recognize that a predetermined word spoken by the speaker has multiple meanings or may cause misunderstanding of the hearer after utterance. In this case, the electronic device 1000 may record the utterance of the speaker, convert the speech signal into text, and display the text on the display unit 1210. Then, the user may say a sub-segment to further explain after selecting a target word of the text displayed on the display unit 1210.

In operation S203 of FIG. 2, the electronic device 1000 may generate output text of the second language by selecting one out of the plurality of translation candidate sentences of the second language corresponding to the input text based on the meaning of the sub-segment.

The electronic device 1000 may generate output text of the second language from the input text of the first language based on the sub-segment additionally explaining the main segment. In this case, the electronic device 1000 may generate output text corresponding only to the main segment of the input text except for the sub-segment.

According to an embodiment, the electronic device 1000 may generate output text by selecting one out of a plurality of translation candidate sentences based on at least one of the first, second, and third weights. The first, second, and third weights will be described later in more detail with reference to FIGS. 5 to 12.

In operation S204 of FIG. 2, the electronic device 1000 may output the output text.

The electronic device 1000 according to an embodiment may convert the output text generated as text into an audio signal by performing text to speech (TTS). The sound output unit 1220 may output the output text converted into the audio signal.

Also, the display unit 1210 may display the output text generated as text.

FIG. 3 is a flowchart illustrating an example method of providing a translation service implemented by the electronic device according to an example embodiment in greater detail.

In operation S301 of FIG. 3, the electronic device 1000 according to an embodiment may receive the input text of the first language. In operation S302, if the input text is a speech signal, the electronic device 1000 may convert the speech signal into text. This is described above with reference to operation S201 of FIG. 2, and thus descriptions thereof will not be repeated.

In operation S303 of FIG. 3, the electronic device 1000 may divide the input text (including a speech signal converted into text) into a main segment and a sub-segment. This is described above with reference to operation S202 of FIG. 2, and thus descriptions thereof will not be repeated.

In operation S304 of FIG. 3, the electronic device 1000 may select one out of a plurality of translation candidate sentences of the second language corresponding to the input text based on the meaning of the sub-segment. In operation S305, the electronic device 1000 may generate output text of the second language corresponding only to the main segment of the input text and not for the sub-segment. This is described above with reference to operation S203 of FIG. 2, and thus descriptions thereof will not be repeated.

In operation S306 of FIG. 3, the electronic device 1000 may convert the output text generated as text into an audio signal. In operation S307, the electronic device 1000 may output the output text as the audio signal. This is described above with reference to operation S204 of FIG. 2, and thus descriptions thereof will not be repeated.

FIGS. 1 to 3 illustrate an example embodiment, and the present disclosure is not limited thereto.

Figure 4:
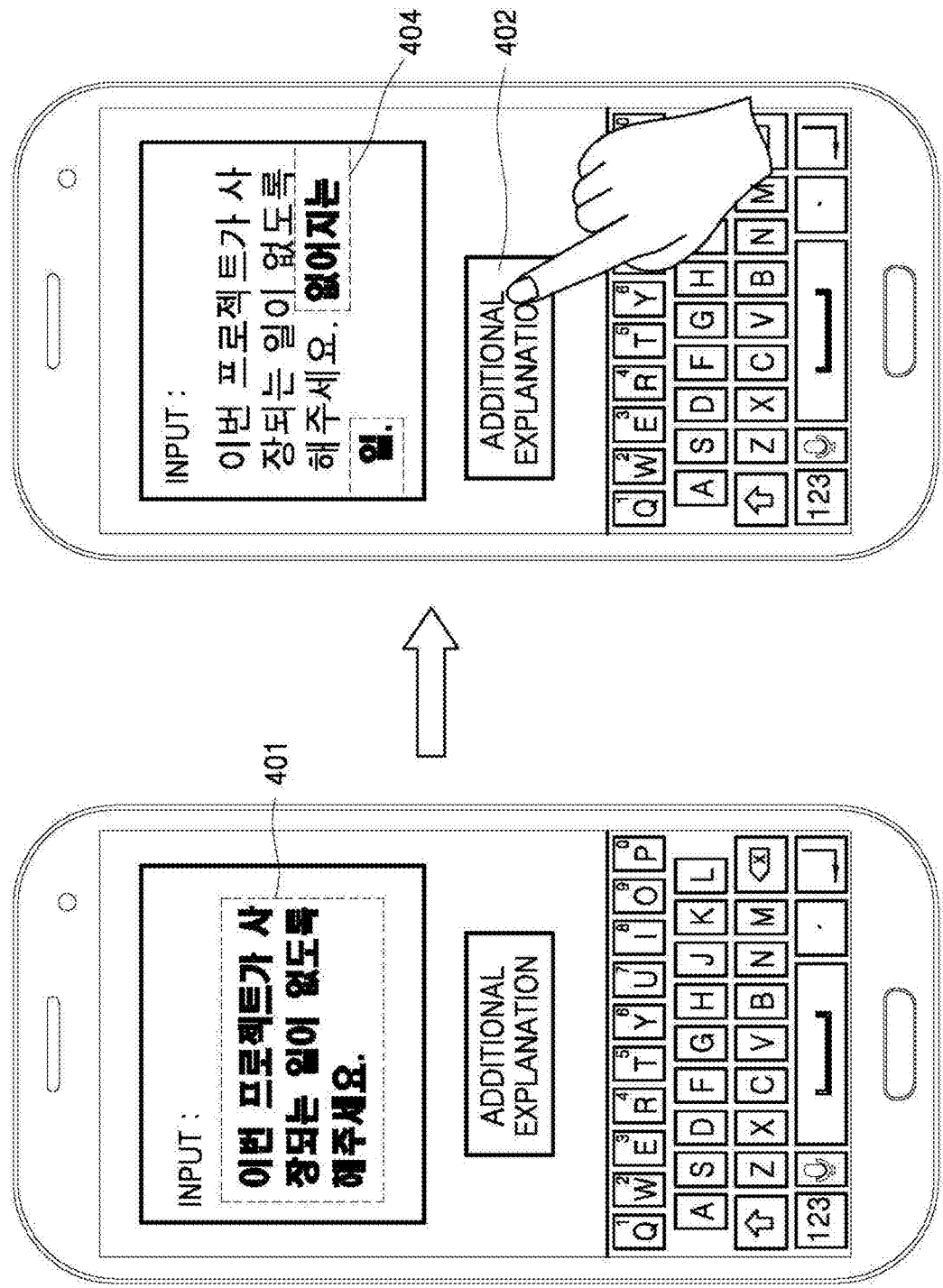
FIG. 4 is a diagram illustrating an example of how an electronic device receives input text according to an example embodiment.

FIG. 4 is a diagram illustrating an example of how an electronic device receives input text according to an embodiment.

According to an embodiment, upon receiving a predetermined user input, the electronic device 1000 may distinguish the main segment from the sub-segment based on the user input.

For example, the electronic device 1000 may receive an input of "이번 프로젝트가 사장되는 일이 없도록 해주세요" 401 as illustrated in FIG. 4. The electronic device 1000 may receive a speech signal of the user via a microphone 1620 (see, e.g., FIG. 14). The electronic device 1000 may also receive text via a keyboard displayed on the display unit 1210 (see, e.g., FIG. 14), without being limited thereto.

Upon receiving a touch input of the user to select an icon (e.g., 'additional explanation' 402) displayed on the display unit 1210, the electronic device 1000 may determine input text of the input speech signal (e.g., "없어지는 일" 404) as the sub-segment.

Also, the electronic device 1000 may determine a following input text (e.g., "없어지는 일" 404) as the sub-segment after receiving the touch input of the user to select the icon (e.g., 'additional explanation' 402) displayed on the display unit 1210.

FIG. 4 illustrates an example embodiment, and the present disclosure is not limited thereto.

Figure 5:
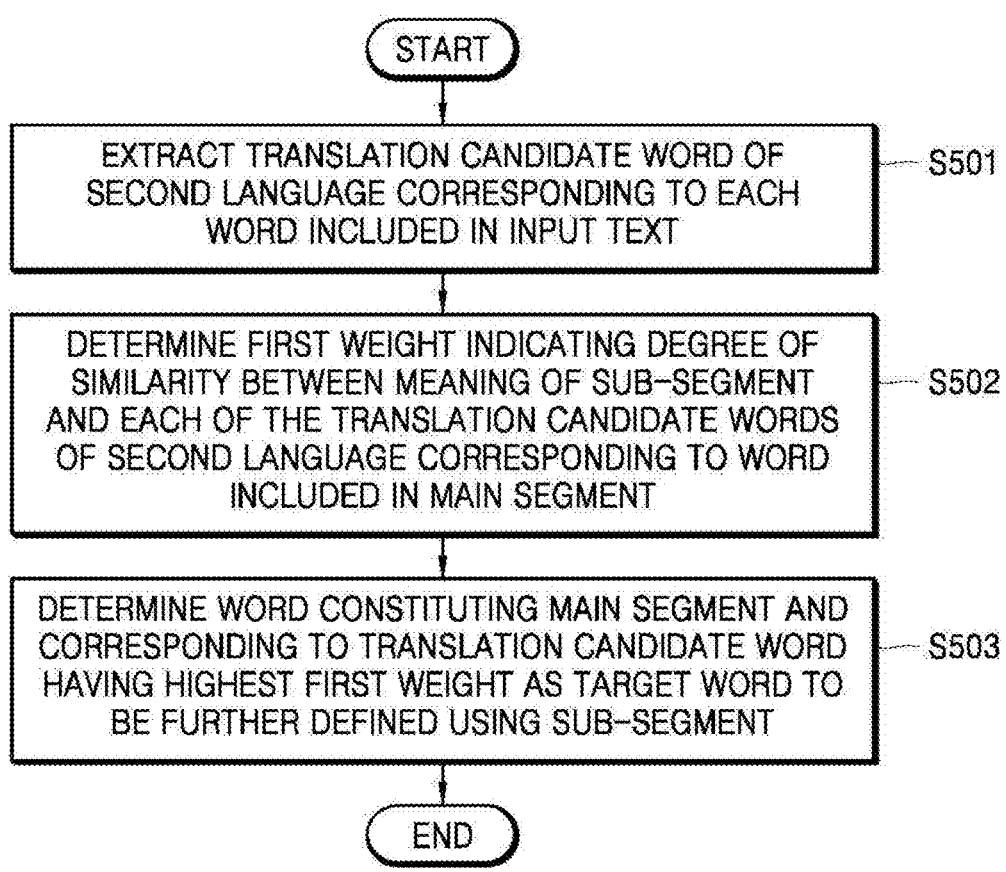
FIG. 5 is a flowchart illustrating an example method of determining a first weight considered while an electronic device generates output text according to an example embodiment.
Figure 6:
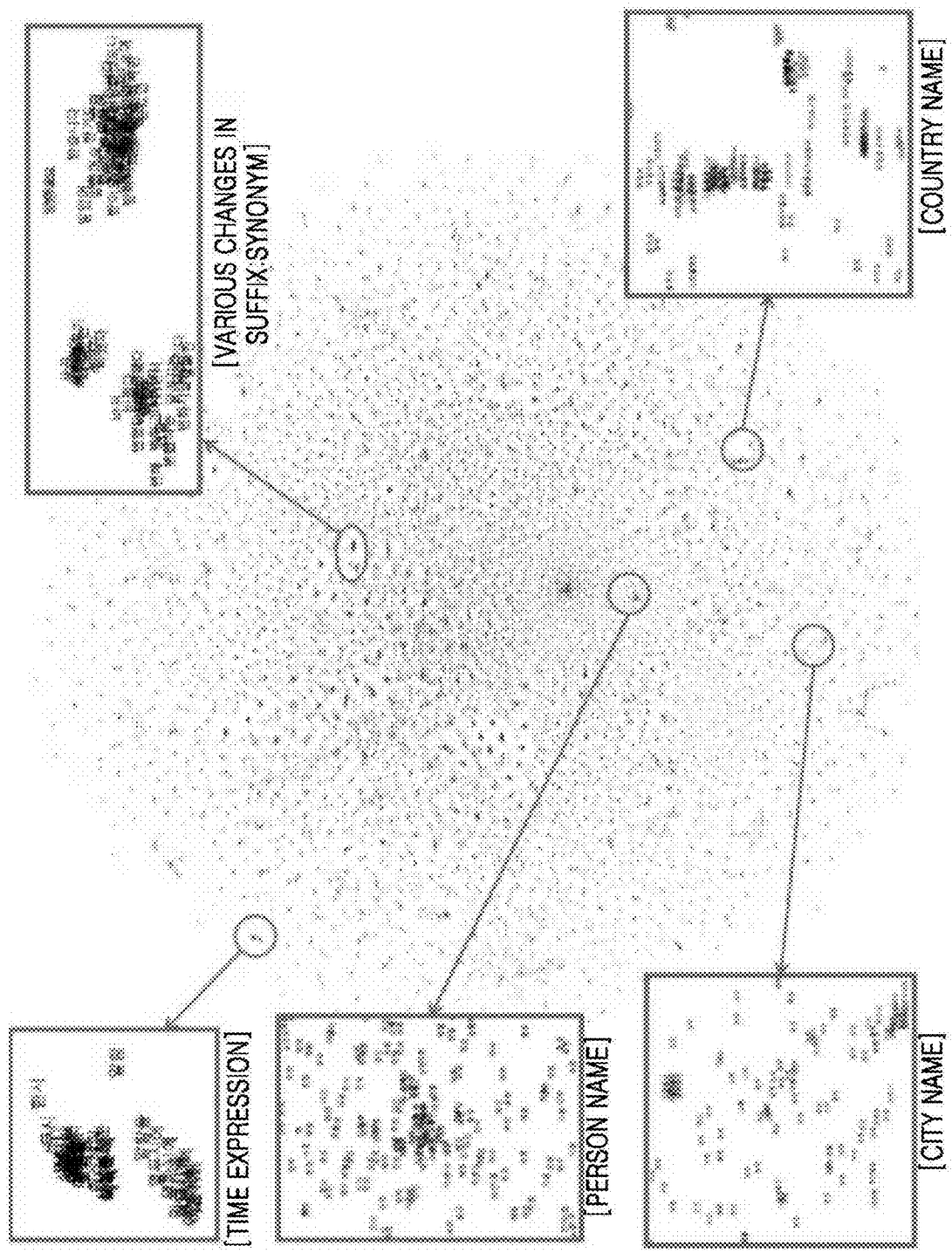
FIG. 6 is a diagram illustrating an example first weight according to an example embodiment.
Figure 7:
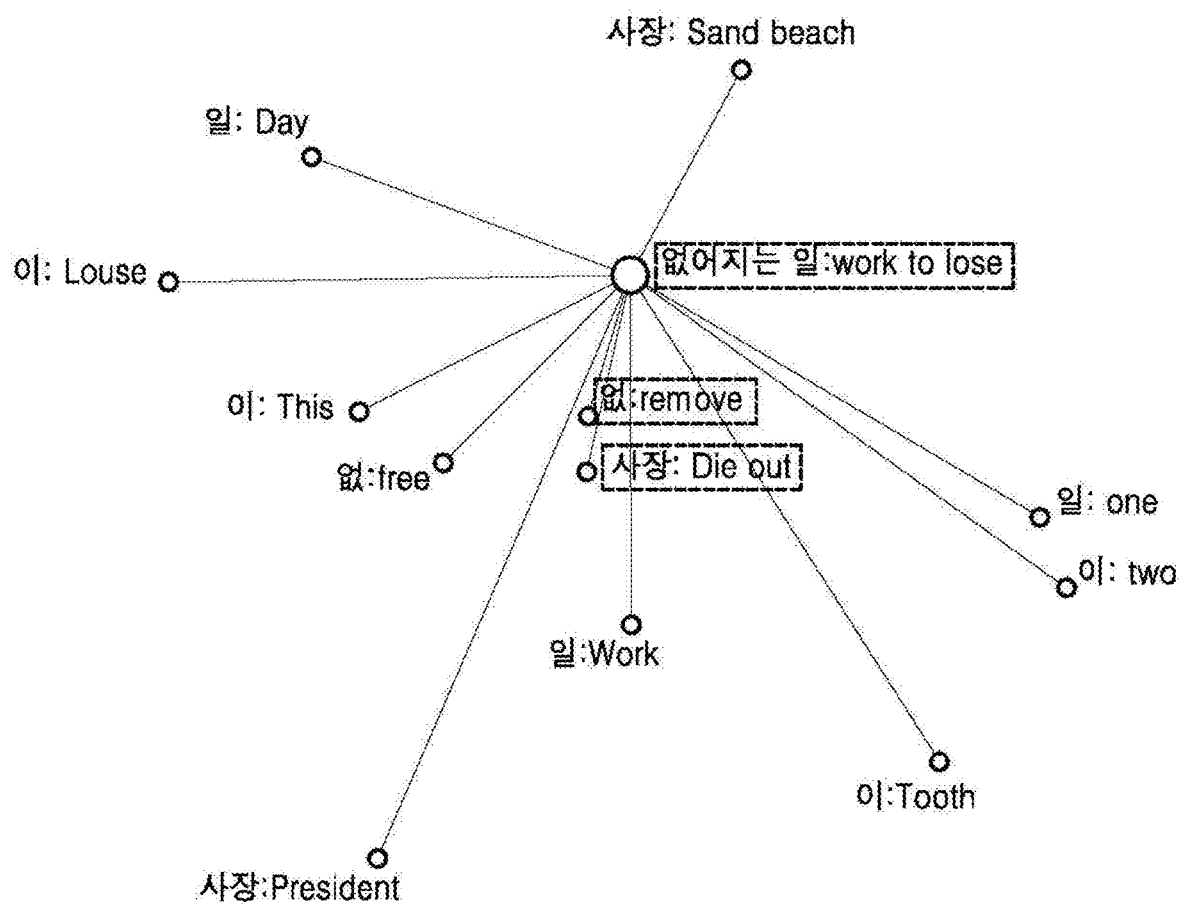
FIGS. 7 and 8 are diagrams illustrating an example method of determining a first weight according to an example embodiment.
Figure 8:
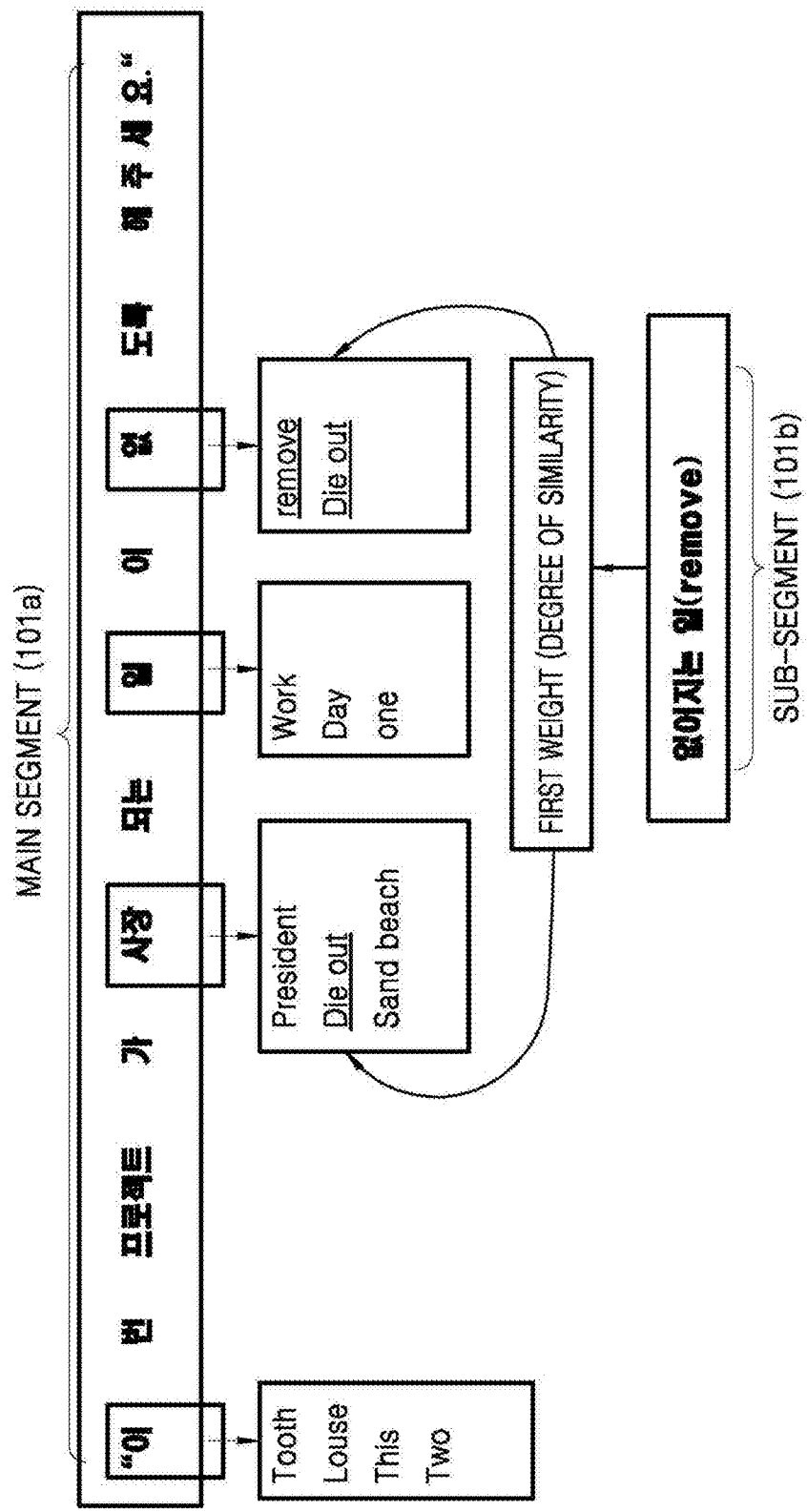

FIG. 5 is a flowchart illustrating an example method of determining a first weight considered when an electronic device generates output text according to an example embodiment. FIG. 6 is a diagram illustrating an example of the first weight according to an example embodiment. FIGS. 7. And 8 are diagrams illustrating an example method of determining the first weight according to an example embodiment. FIGS. 6 to 8 will be described while describing the flowchart of FIG. 5.

In operation S501 of FIG. 5, the electronic device 1000 may extract translation candidate words of the second language for each of the words included in the input text.

Referring to FIG. 8, the electronic device 1000 may extract translation candidate words of the second language (English) for each of the words (for example, '이', '사장', '일', '없', and the like) included in the main segment 101a. For example, candidate words such as 'Tooth/Louse/This/Two' may be extracted for the word '이', candidate words such as 'President/Die out/Sand beach' may be extracted for the word '사장', candidate words such as 'Work/Day/One' may be extracted for the word 일, and candidate words such as 'Remove/Die out' may be extracted for the word '없'.

Also, the electronic device 1000 may extract 'remove' as a candidate word of the second language for the sub-segment 101b '없어지는 일 (work to lose)'. The electronic device 1000 according to an embodiment may also extract candidate words for another word or morpheme included in the input text.

In operation S502 of FIG. 5, the electronic device 1000 may determine the first weight indicating the degree of similarity between the meaning of the sub-segment and each of the translation candidate words of the second language corresponding to one of the words included in the main segment.

The first weight (degree of similarity) may refer to a value indicating a distance between a first word and a second word related to the first word in a space. Referring to FIG. 6, words of a language may be located at predetermined positions in a virtual space.

For example, when a distance between "rabbit" and "lion" is closer than that between the "rabbit" and "car", the words "rabbit" and "lion" may have a higher first weight (degree of similarity).

Referring to FIG. 7, since "remove" among the candidate words for "없" and "die out" among the candidate words for "사장" are located close to "없어지는 일 : work to lose", they may have higher first weights (degrees of similarity) than the other candidate words.

Referring to FIG. 8, the electronic device 1000 may determine that '사장: die out' and '없: remove and die out' included in the main segment have higher first weights than the other words included in the main segment based on the meaning of the sub-segment 101b (없어지는 일 : remove).

In operation S503 of FIG. 5, the electronic device 1000 may determine a word corresponding to a translation candidate word having a highest first weight as a target word which requires further defining based on the sub-segment among the words included in the main segment.

Referring to FIG. 8, the electronic device 1000 may set the words '사장' and '없' having higher first weights and included in the main segment as target words which require further defining based on the sub-segment. Also, the electronic device 1000 may determine the word '사장' as a target word by considering at least one of the second and third weights, which will be described later, in addition to the first weight.

According to an embodiment, after determining the target word, the electronic device 1000 may generate output text by determining the degree of similarity between the translation candidate word for the target word and the meaning of the sub-segment.

Figure 9:
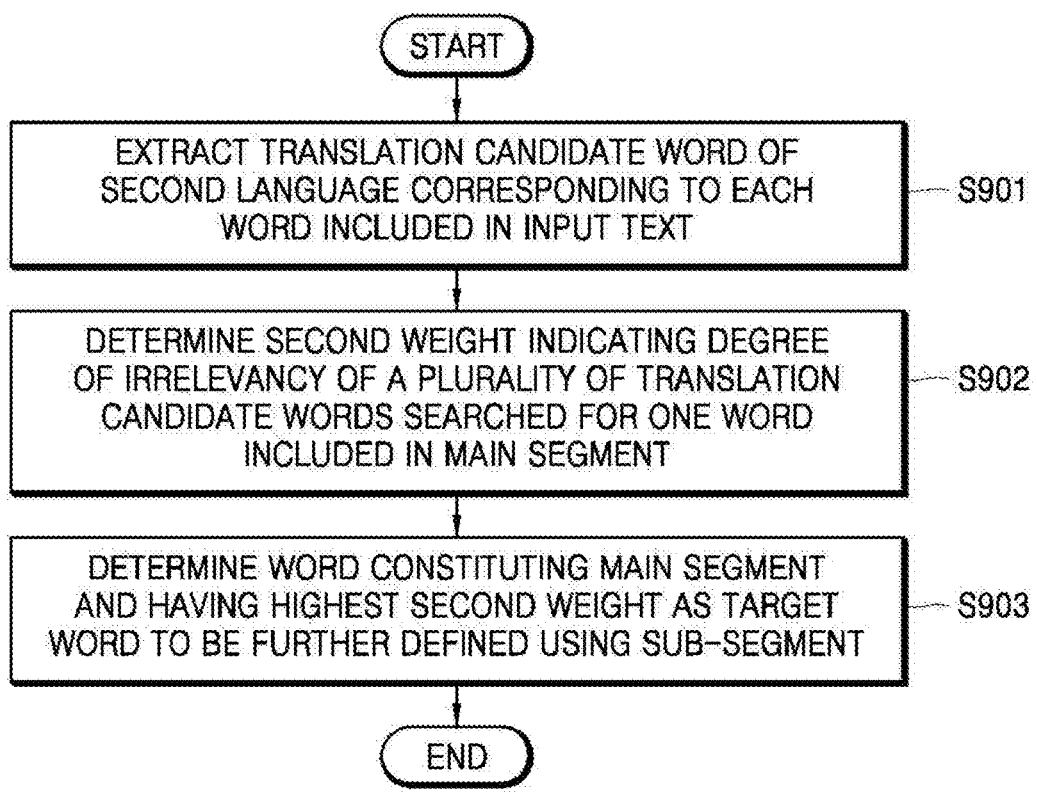
FIG. 9 is a flowchart illustrating an example method of determining a second weight considered when an electronic device according to an embodiment generates output text.
Figure 10:
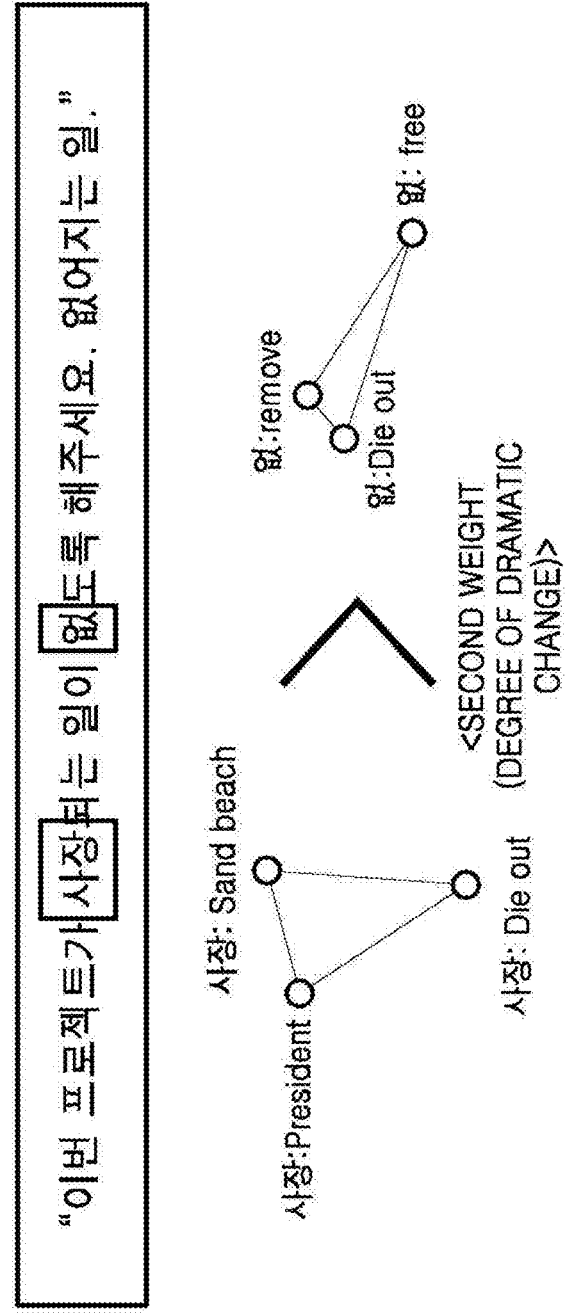
FIG. 10 is a diagram illustrating an example method of determining a second weight according to an example embodiment.

FIG. 9 is a flowchart illustrating an example method of determining a second weight considered when the electronic device generates output text according to an example embodiment. FIG. 10 is a diagram illustrating an example method of determining a second weight according to an example embodiment. FIG. 10 will be described while describing the flowchart of FIG. 9.

In operation S901 of FIG. 9, the electronic device 1000 may extract translation candidate words of the second language for each of the words included in the input text.

For example, as described above with reference to FIG. 8, candidate words such as 'President/Die out/Sand beach' may be extracted for the word '사장' and candidate words such as 'Remove/Die out' may be extracted for the word '없'. The electronic device 1000 may also extract candidate words for another word or morpheme included in the input text.

In operation S902 of FIG. 9, if a plurality of translation candidate words of the second language is searched for one word included in the main segment, the electronic device 1000 may determine the second weight indicating the degree of irrelevancy of the translation candidate words.

Referring to FIG. 10, the words "사장" and "'없" have a plurality of translation candidate words, respectively, and it may be confirmed that an area of a space defined by the translation candidate words for "사장" is greater than an area of a space defined by the translation candidate words for "'없". Thus, the second weight (degree of dramatic change) of "사장" may be greater than that of "'없".

A large difference in the space created by the translation candidate words may indicate that the sub-segment may increase translation accuracy and the risk of translation errors occurring may increase by selecting an incorrect translation candidate word.

According to an embodiment, the second weight (degree of dramatic change) refers to a relevance between one translation candidate word and another translation candidate word among a plurality of translation candidate words corresponding to one word. The second weight may also refer to the degree of dramatic change of a meaning when the translation candidate word is incorrectly selected out of the plurality of translation candidate words.

Thus, it may be determined that there is a higher necessity to convey a clear meaning to the counterpart through additional explanation as the second weight (degree of dramatic change) increases.

In operation S903 of FIG. 9, the electronic device 1000 may set a word included in the main segment and having the highest second weight as a target word which requires further defining based on the sub-segment.

Referring to FIG. 10, the electronic device 1000 according to an embodiment may increase translation accuracy by selecting the word "사장" as the target word which requires further defining based on the sub-segment instead of the word "없".

According to an embodiment, after determining the target word, the electronic device 1000 may generate output text, as a translation result, by determining the degree of similarity between the meaning of the sub-segment and the translation candidate words of the target word.

FIGS. 5 to 9 illustrate various example embodiments, and the present disclosure is not limited thereto.

Figure 11:
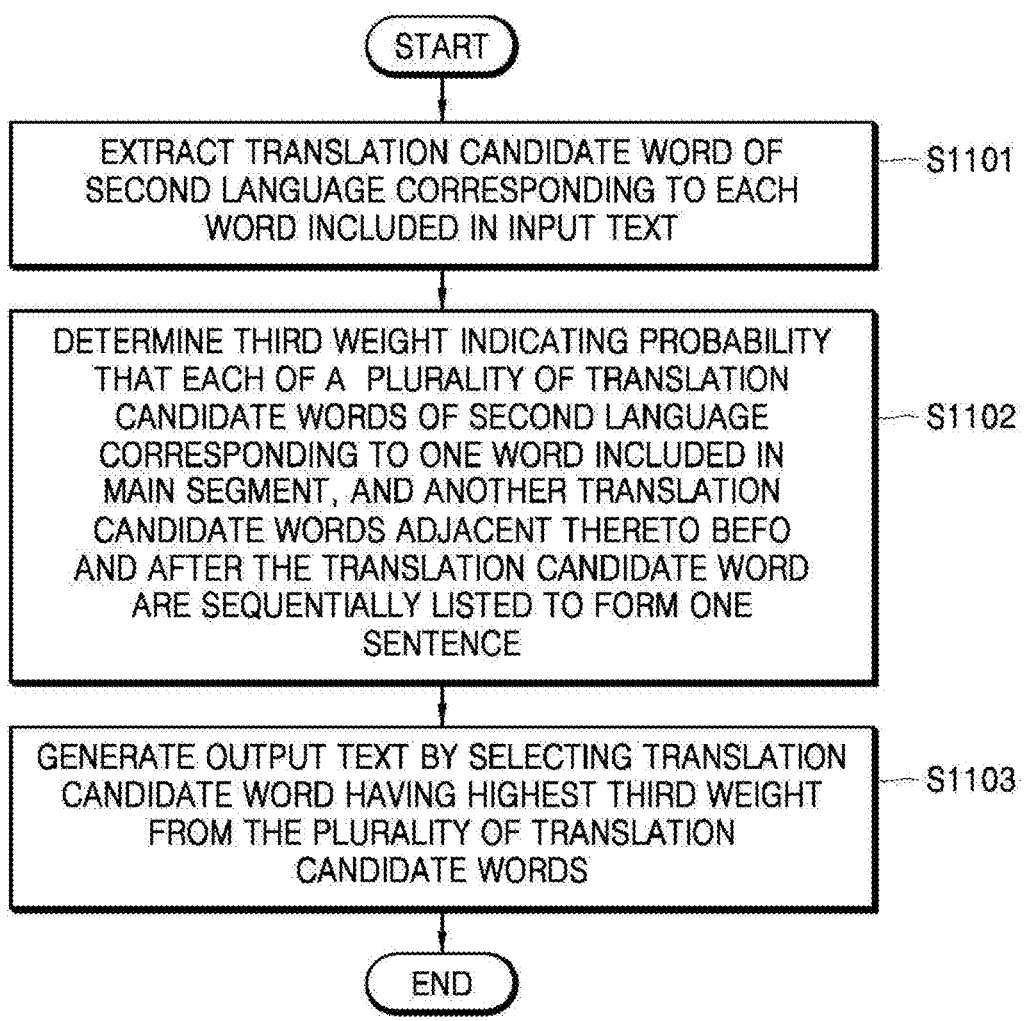
FIG. 11 is a flowchart illustrating an example method of determining a third weight considered when an electronic device according to an example embodiment generates output text.
Figure 12:
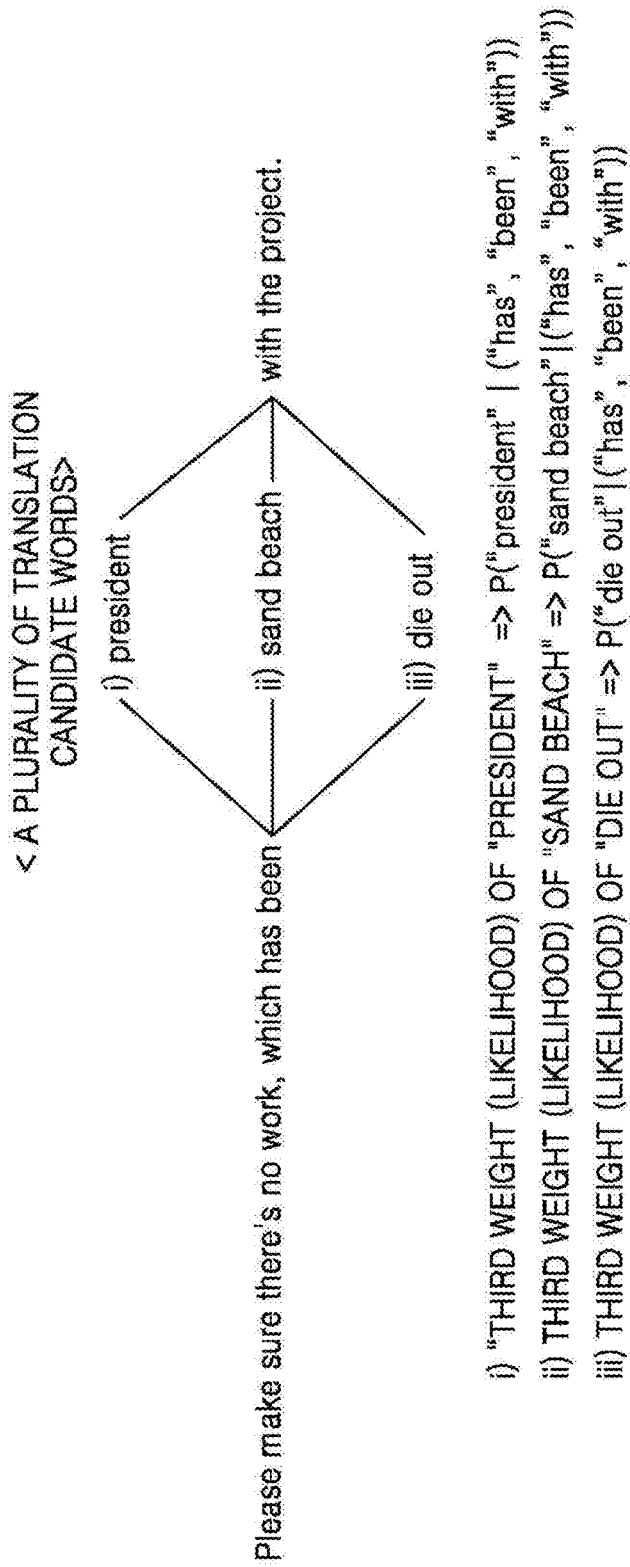
FIG. 12 is a diagram illustrating an example method of determining a third weight according to an example embodiment.

FIG. 11 is a flowchart illustrating an example method of determining a third weight considered when an electronic device generates output text according to an example embodiment. FIG. 12 is a diagram illustrating an example method of determining the third weight according to an example embodiment. FIG. 12 will be described while describing the flowchart of FIG. 11.

In operation S1101 of FIG. 11, the electronic device 1000 may extract translation candidate words of the second language for each of the words included in the input text.

For example, as described above with reference to FIG. 8, candidate words such as 'President/Die out/Sand beach' may be extracted for the word '사장'. The electronic device 1000 may also extract candidate words for another word or morpheme included in the input text.

In operation of S1102 of FIG. 11, if a plurality of translation candidate words of the second language are searched for one of the words included in the main segment, the electronic device 1000 may determine the third weight indicating a probability that each of the translation candidate words and another translation candidate words adjacent thereto before and after the translation candidate word are sequentially listed to form one sentence.

The third weight (likelihood) according to an embodiment may be a value indicating likelihood of constituting one sentence or phrase using a string of sequential words. For example, a string of words "rabbit eats grass" has likelihood of happening far higher than a string of words "rabbit eats sand".

Referring to FIG. 12, a probability that each of translation candidate words "president", "sand beach", and "die out" for the word "사장" is sequentially listed with respect to another translation candidate words "has", "been", and "with" located before and after the word to constitute one sentence may be calculated (determined).

P(X3|X1, X2) may refer to a probability that X1 and X2 are sequentially listed and then X3 is listed.

Referring to FIG. 12, the word "die out" among the translation candidate words for "사장" may have a higher third weight (likelihood) that is a probability that the "die out" is sequentially listed with respect to another translation candidate words "has", "been", and "with".

In operation S1103 of FIG. 11, the electronic device 1000 may generate the output text by selecting the translation candidate word having the highest third weight among the plurality of translation candidate words.

Referring to FIG. 12, the electronic device 1000 may generate the output text "Please make sure there's no work, which has been die out with the project." by selecting "die out" having the highest third weight.

FIGS. 11 and 12 illustrate example embodiments, and the present disclosure is not limited thereto.

FIGS. 13 and 14 are block diagrams illustrating an example electronic device according to an example embodiment.

Referring to FIG. 13, the electronic device 1000 according to an example embodiment may include a processor (e.g., including processing circuitry) 1300, an input unit (e.g., including input circuitry) 1800, and an output unit (e.g., including output circuitry) 1200.

However, the elements illustrated in FIG. 13 are not essential elements of the electronic device 1000. The electronic device 1000 may be implemented using more or less elements than those illustrated in FIG. 13.

For example, with reference to FIG. 14, the electronic device 1000 according to an embodiment may further include a user input unit (e.g., including input circuitry) 1100, a sensing unit (e.g., including at least one sensor) 1400, a communication unit (e.g., including communication circuitry) 1500, an audio/video (A/V) input unit (e.g., including A/V input circuitry) 1600, and a memory 1700 in addition to the processor 1300, the input unit 1800, and the output unit 1200 illustrated in FIG. 13.

The input unit 1800 of FIG. 13 may include the user input unit 1100 and the A/V input unit 1600 including a camera 1610 and the microphone 1620.

The user input unit 1100 may refer, for example, to a device used to input data to control the electronic device 1000 by the user. For example, the user input unit 1100 may include various input circuitry, such as, for example, and without limitation, a key pad, a dome switch, a touch pad (capacitive overlay, resistive overlay, infrared beam, surface acoustic wave, integral strain guage, piezo electric, and the like), a jog wheel, a jog switch, and the like, without being limited thereto.

According to an embodiment, the user input unit 1100 may receive the input text to be translated.

The output unit 1200 may output an audio signal, a video signal, a vibration signal. The output unit 1200 may include various output circuitry, including, for example, the display unit 1210, the sound output unit 1220, and a vibration motor 1230.

The display unit 1210 may include various display circuitry and display elements that display information processed by the electronic device 1000.

For example, the display unit 1210 may include a user interface UI to execute an application providing a translation service, a user interface to receive input text to be translated, a use interface to receive a main segment and a sub-segment separately from each other, and a user interface to output output text as a translation result.

Also, the display unit 1210 may display the output text of the second language as a translation result of the input text of the first language.

Meanwhile, if the display unit 1210 is implemented using a touch screen having a layered structure including a touch pad, the display unit 1210 may also be used as an input device in addition to an output device. The display unit 1210 may include at least one of a liquid crystal display, a thin film transistor-liquid crystal display, an organic light-emitting diode, a flexible display, a three-dimensional (3D) display, and an electrophoretic display. Also, the electronic device 1000 may include two or more display units 1210 in accordance with the configuration of the electronic device 1000. In this case, the two or more display units 1210 may be arranged to face each other by using hinges.

The sound output unit 1220 may include various circuitry that outputs audio data received from the communication unit 1500 or stored in the memory 1700. The sound output unit 1220 may also output sound signals related to functions performed in the electronic device 1000 (e.g., call signal reception sound, message reception sound, and notification sound). The sound output unit 1220 may include various sound output circuitry, such as, for example, and without limitation, a speaker, a buzzer, and the like.

According to an embodiment, the sound output unit 1220 may output the output text, which is a translation result of the input text of the first language to be translated, as sounds.

The vibration motor 1230 may output a vibration signal. For example, the vibration motor 1230 may output a vibration signal corresponding to output of audio data or video data (e.g., call signal reception sound and message reception sound). The vibration motor 1230 may also output a vibration signal in case of receiving a touch input via the touch screen.

In general, the processor 1300 may include various processing circuitry and controls the overall operation of the electronic device 1000. For example, the processor 1300 may control the overall operation of the user input unit 1100, the output unit 1200, the sensing unit 1400, the communication unit 1500, and the A/V input unit 1600 by executing programs stored in the memory 1700.

Particularly, the processor 1300 may divide the input text into the main segment and the sub-segment.

The processor 1300 may also generate the output text of the second language by selecting one out of a plurality of translation candidate sentences of the second language corresponding to the input text, based on the meaning of the sub-segment.

The processor 1300 may also generate the output text corresponding only to the main segment of the input text except for the sub-segment.

The processor 1300 may also extract translation candidate words of the second language corresponding to each of the words included in the input text.

The processor 1300 may also determine the first weight indicating the degree of similarity between the meaning of the sub-segment and every translation candidate word of the second language corresponding to each of the words constituting the main segment.

The processor 1300 may also determine a word corresponding to the translation candidate word having the highest first weight and included in the main segment as a target word which requires further defining based on the sub-segment.

The processor 1300 may also extract translation candidate words of the second language corresponding to each of the words included in the input text, and when a plurality of translation candidate words of the second language is searched for a word included in the main segment, determine the second weight indicating the degree of irrelevancy of the plurality of translation candidate words.

The processor 1300 may also set a word included in the main segment and having the highest second weight as a target word which requires further defining based on the sub-segment.

Also, the processor may extract translation candidate words of the second language for the words included in the input text, and when a plurality of translation candidate words of the second language is searched for the words included in the main segment, determine the third weight indicating a probability that each of the plurality of translation candidate words and another translation candidate words located adjacent thereto before and after the translation candidate word are sequentially listed to constitute one sentence.

The processor 1300 may also generate the output text by selecting one translation candidate word having the highest third weight out of the plurality of translation candidate words.

Also, if the received input text is a speech signal, the processor 1300 may convert the speech signal into text.

Also, if the input text includes a predetermined keyword, the processor 1300 may determine one portion of the input text before the keyword as the main segment and another portion after the keyword as the sub-segment.

The processor 1300 may also determine a portion of the input text input simultaneously with a predetermined user input or a portion input after the user input as the sub-segment.

The processor 1300 may also convert the output text generated as text into audio signals.

The sensing unit 1400 may include various sensors that sense the state of the electronic device 1000 or the state around the electronic device 1000 and transmit the sensed information to the processor 1300.

The sensing unit 1400 may include various sensors, such as, for example, and without limitation, at least one of a magnetic sensor 1410, an acceleration sensor 1420, a temperature/humidity sensor 1430, an infrared sensor 1440, a gyroscope sensor 1450, a position sensor (e.g., GPS) 1460, an air pressure sensor 1470, a proximity sensor 1480, and an RGB sensor (color or illuminance sensor) 1490, without being limited thereto. Since functions of these sensors may be deduced from the names thereof by a person skilled in the art, detailed descriptions thereof will be omitted.

The communication unit 1500 may include one or more elements comprising communication circuitry that allow communications between the electronic device 1000 and another device (not shown) or between the electronic device 1000 and a server (not shown). For example, the communication unit 1500 may include a short-range wireless communication unit 1510, a mobile communication unit 1520, and a broadcast receiving unit 1530.

The short-range wireless communication unit 1510 may include various short-range wireless communication circuitry, such as, for example, and without limitation, a Bluetooth communication unit, a Bluetooth Low Energy (BLE) communication unit, a Near Field Communication unit, a WLAN (Wi-Fi) communication unit, a Zigbee communication unit, an infrared Data Association (IrDA) communication unit, a Wi-Fi Direct (WFD) communication unit, an ultra wideband (UWB) communication unit, and an Ant+ communication unit, without being limited thereto.

The mobile communication unit 1520 may include various communication circuitry that transmits and receives radio signals to and from at least one of a base station, an external terminal, and a server on a mobile communication network. In this regard, the radio signals may include various types of data depending on a voice call signal, a video call signal, or a text/multimedia message transmission/reception.

The broadcast receiving unit 1530 may include various communication circuitry that receives broadcast signals and/or broadcast-related information from the outside through a broadcast channel. The broadcast channel may include satellite channels and terrestrial channels. According to an embodiment, the electronic device 1000 may not include the broadcast receiving unit 1530.

The A/V input unit 1600 may include various A/V input circuitry and is used to input an audio signal or a video signal and may include the camera 1610 and the microphone 1620. The camera 1610 may acquire an image frame such as a still image or a moving image through an image sensor in a video communication mode or a photographing mode. An image captured by the image sensor may be processed by the processor 1300 or a separate image processor (not shown).

The image frame processed by the camera 1610 may be stored in the memory 1700 or transmitted to an external device via the communication unit 1500. Two or more cameras 1610 may be used according to the configuration of a terminal.

The microphone 1620 receives a sound signal from the outside and processes the received signal into electrical voice data. For example, the microphone 1620 may receive a sound signal from an external device or a speaker. The microphone 1620 may use various noise reduction algorithms for eliminating noise generated while receiving external sound signals.

According to an embodiment, the microphone 1620 may receive a speech signal corresponding to the input text of the first language to be translated from the speaker.

The memory 1700 may store a program used for processing and control operation of the processor 1300 and data input to or output from the electronic device 1000.

The memory 1700 may include at least one storage medium such as a flash memory type memory, a hard disk type memory, a multimedia card micro type memory, a card type memory (e.g., SD or XD memory), Random Access Memory (RAM), Static Random Access Memory (SRAM), Read-Only Memory (ROM), Electrically Erasable Programmable Read-Only Memory (EEPROM), (Programmable Read-Only Memory (PROM), a magnetic memory, magnetic disc, and an optical disc.

The programs stored in the memory 1700 may be classified into a plurality of modules according to functions thereof. For example, the programs may be classified into a UI module 1710, a touch screen module 1720, a notification module 1730, and the like.

The UI module 1710 may provide a specified user interface (UI), graphic user interface (GUI), or the like interworking with the electronic device 1000 for each application. The touch screen module 1720 may sense a touch gesture of the user applied to the touch screen and transmit information about the touch gesture to the processor 1300. The touch screen module 1720 according to an embodiment may recognize and analyze a touch code. The touch screen module 1720 may be implemented using a separate hardware component including a processor.

Various sensors may be provided in or near the touch screen to detect a touch or a near touch on the touch screen. A tactile sensor is an example of the sensor to detect a touch on the touch screen. The tactile sensor refers to a sensor that detects a contact of a given object to the degree or more of a person feels. The tactile sensor may obtain various information such as roughness of a contact surface, rigidity of a contact object, and temperature of a contact point.

Another example of the sensor to detect a touch on the touch screen is a proximity sensor.

The proximity sensor refers to a sensor that detects the presence of an object approaching a predetermined detection surface or an object around the detection surface by using electromagnetic force or infrared rays without using mechanical contact. Examples of the proximity sensor include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. The touch gesture of the user may include tab, touch and hold, double tab, drag, panning, flick, drag and drop, swipe, and the like.

The notification module 1730 may generate a signal to notify occurrence of an event of the electronic device 1000. Examples of the event occurring in the electronic device 1000 may include call signal reception, message reception, key signal input, schedule notification, and the like. The notification module 1730 may output a notification signal in the form of a video signal through the display unit 1210, a notification signal in the form of an audio signal through the sound output unit 1220, or a notification signal in the form of a vibration signal through the vibration motor 1230.

Meanwhile, the embodiments described above may be written as computer programs and may be implemented in general-use computers that execute the programs using a computer readable medium. In addition, a data structure used in the embodiments may be recorded on the computer readable medium via various devices. Also, the aforementioned embodiments may be embodied in the form of a non-transitory recording medium including instructions executable by a computer, such as a program module, executed by a computer. For example, methods implemented by software modules or algorithms may be stored in computer readable recording media as codes or program instructions that may be read and executed by the computer.

The non-transitory computer readable medium may be any recording medium that may be accessed by a computer and may include volatile and non-volatile media and removable and non-removable media. The computer readable medium may include magnetic storage media, such as ROM, floppy disks, and hard disks, optical storage media, such as CO ROMs and DVDs, without being limited thereto. The computer readable medium may also include computer storage media and communication media.

In addition, a plurality of computer readable recording media may be distributed over computer systems connected via a network, and data, such as program instructions and codes, stored in the distributed recording media may be executed by at least one computer.

The descriptions given above are to merely provide illustrations of various example embodiments and should not be construed as limiting the scope of the present disclosure. For the conciseness of the disclosure, conventional electronic components, control systems, software, and other functional aspects of the systems may be omitted.

The above description of the present disclosure is provided for the purpose of illustration, and it would be understood by those skilled in the art that various changes and modifications may be made without changing technical conception and essential features of the present disclosure. Thus, it is clear that the above-described illustrative embodiments are illustrative in all aspects and do not limit the present disclosure. For example, each component described to be of a single type may be implemented in a distributed manner. Likewise, components described to be distributed may be implemented in a combined manner.

Throughout the disclosure, the use of examples and exemplary terms, such as "and the like" is only illustrative and the scope of the present disclosure is not limited by these examples or exemplary terms unless limited by the following claims.

Also, the elements described in the present disclosure may not be essential elements unless the elements are clearly described with the terms "essential", "important", and the like.

It will be understood by those skilled in the art that various changes in form and details may be made therein without departing from the spirit and scope of the present disclosure.

The embodiments described in the disclosure and illustrated in the drawings are only illustrative and are not intended to represent all aspects of the disclosure, such that various equivalents and modifications may be made without departing from the spirit of the disclosure. Thus, the various example embodiments should be considered in descriptive sense only and not for purposes of limitation.

The scope of the present disclosure is defined by the following claims and their equivalents rather than by the detailed description of the illustrative embodiments. It shall be understood that all modifications and embodiments conceived from the meaning and scope of the claims and their equivalents are included in the scope of the present disclosure.

The terms "unit", "module", and the like used herein refer to a unit used to process at least one function or operation and may be implemented by a software component, a hardware component, or any combination thereof.

The "unit" and "module" may be configured to reside on the addressable storage medium and configured to execute on one or more processors.

The "unit" and "module" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Throughout the disclosure, a phrase "A may include one of a1, a2 and a3" indicates that exemplary elements that may be included in the component A are a1, a2 or a3 in a broad sense.

Here, the elements that may comprise the component A is not necessarily limited to a1, a2, or a3. It should be noted, therefore, that the elements that may constitute the component A are not intended to preclude another element not illustrated in addition to a1, a2, and a3.

In addition, the phrase means A may include a1, a2, or a3. The above phrase does not indicate that the elements constituting the component A are necessarily selected from a predetermined group. For example, it should be limitedly interpreted as "a1, a2 and a3 selected from a group necessarily including a1, a2 and a3 constitute the component A".

Throughout the disclosure, the phrase "at least one of a1, a2, and a3" means "a1", "a2", "a3", "a1 and a2", "a1 and a3", "a2 and a3", or "a1, a2 and a3".

Thus, unless "at least one of a1", "at least one of a2", and "at least one of a3" is clearly stated in the disclosure, the phrase "at least one of a1, a2 and a3" is not interpreted as "at least one of a1", "at least one of a2", and "at least one of a3".

However, the embodiments should be considered in descriptive sense only and not for the purpose of limitation. Also, it will be understood that the disclosure is not limited by the order of operations illustrated in the flowcharts of FIGS. 2, 3, 5, 9, and 11, and some of the operations may be omitted or added and the order of operations may be modified in accordance with various embodiments.

It should be understood that embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. An electronic device configured to provide a translation service comprising:
    a display; and
    a processor configured to:
    receive an input text of a first language via a user input on the display, the input text comprising a first input text and a second input text;
    detect the first input text and the second input text from among the input text based on a predetermined criteria, the first input text comprising text which is a target to be translated to a second language, and the second input text comprising text explaining meaning of the first input text;
    determine one translation candidate text from a plurality of translation candidate texts corresponding to the detected first input text of the second language, based on a meaning of the detected second input text;
    generate output text comprising the determined translation candidate text corresponding to the detected first input text; and
    output the generated output text via the display,
    wherein the processor is configured to set a first text segment received before a keyword as the first input text, and a second text segment received after the keyword as the second input text.

2. The electronic device of claim 1, wherein the processor is configured to:
    extract translation candidate words of the second language for words included in the first input text, and
    determine first weights for the translation candidate words of the second language, the first weights indicating a degree of similarity between the translation candidate words of the second language for words included in the first input text and the meaning of the text included in the second input text.

3. The electronic device of claim 2, wherein the processor is configured to set a word included in the first input text and corresponding to a translation candidate word having a highest first weight as a target word which requires further defining based on the second input text.

4. The electronic device of claim 1, wherein the processor is configured to extract translation candidate words of the second language for words included in the first input text, and to determine, second weights for the translation candidate words of the second language, the second weights indicating a degree of irrelevancy between the translation candidate words of the second language for words included in the first input text, when a plurality of translation candidate words of the second language is searched for among the words included in the first input text.

5. The electronic device of claim 4, wherein the processor is configured to set one of the words included in the first input text and having a highest second weight as a target word second input text which requires further defining based on the second input text.

6. The electronic device of claim 1, wherein the processor is configured to extract translation candidate words of the second language for words included in the first input text, and to determine third weights for the translation candidate words of the second language, the third weights indicating probabilities of a sequential order between adjacent translation candidate words included among the translation candidate words, when a plurality of translation candidate words of the second language is searched for among the words included the first input text.

7. The electronic device of claim 6, wherein the processor is configured to select a translation candidate word having a highest third weight from the plurality of translation candidate words of the second language and to generate the output text using the selected translation candidate word.

8. The electronic device of claim 1, wherein the processor is further configured to receive the first input text via at least one of speech signals and characters input via a keyboard, and the processor is configured to convert the input speech signals into the characters when the speech signals are received.

9. The electronic device of claim 1, wherein the processor is configured to set, as the second input text, a portion of text which is input simultaneously with an user input or a portion of text which is input after the user input.

10. The electronic device of claim 1, wherein the processor is configured to convert the output text to an audio signal, and the output unit is configured to output at least one of the output text and the audio signal.

11. A method of providing a translation service by an electronic device, the method comprising:

receiving an input text of a first language via a user input on a display, the input text comprising a first input text and a second input text;

detecting the first input text and the second input text from among the input text based on a predetermined criteria, the first input text comprising text which is a target to be translated to a second language, and the second input text comprising text explaining meaning of the first input text;

determining one translation candidate text from a plurality of translation candidate texts corresponding to the detected first input text of the second language, based on a meaning of the detected second input text;

generating output text comprising the determined translation candidate text corresponding to the detected first input text; and outputting the generated output text via the display, setting a text segment received before a predetermined keyword as the first input text and a text segment received after the predetermined keyword as the second input text.

12. The method of claim 11, wherein the selecting one translation candidate text comprises:

extracting translation candidate words of the second language for words included in the first input text;

determining first weights for the translation candidate words of the second language, the first weights indicating a degree of similarity between the translation candidate words of the second language for words included in the first input text and the meaning of the text included in the second input text; and setting a word included in the first input text and corresponding to a translation candidate word having a highest first weight as a target word which requires further defining based on the second input text.

13. The method of claim 11, wherein the selecting one translation candidate text comprises:

extracting translation candidate words of the second language for words included in the first input text;

determining, second weights for the translation candidate words of the second language, the second weights indicating a degree of irrelevancy between the translation candidate words of the second language for words included in the first input text, when a plurality of translation candidate words of the second language is searched for among the words included in the first input text; and setting one of the words included in the first input text and having a highest second weight as a target word which requires further defining based on the second input text.

14. The method of claim 11, wherein the selecting one translation candidate text comprises:

extracting translation candidate words of the second language for words included in the first input text;

determining third weights for the translation candidate words of the second language, the third weights indicating probabilities of a sequential order between adjacent translation candidate words included among the translation candidate words when a plurality of translation candidate words of the second language is searched for among the words included the first input text; and selecting a translation candidate word having a highest third weight from the plurality of translation candidate words of the second language and generating the output text using the selected translation candidate word.

15. The method of claim 11, further comprising setting, as the second input text, a portion of text which is input simultaneously with an user input or a portion of text which is input after the input.

16. A non-transitory computer readable recording medium comprising a program, which when executed by a computer, performs the method of claim 11.

* * * * *